June 14, 1949. J. O. JACKSON 2,472,949
FLEXIBLE NOZZLE FOR SUPERSONIC WIND TUNNELS
Filed Oct. 31, 1947 7 Sheets-Sheet 2
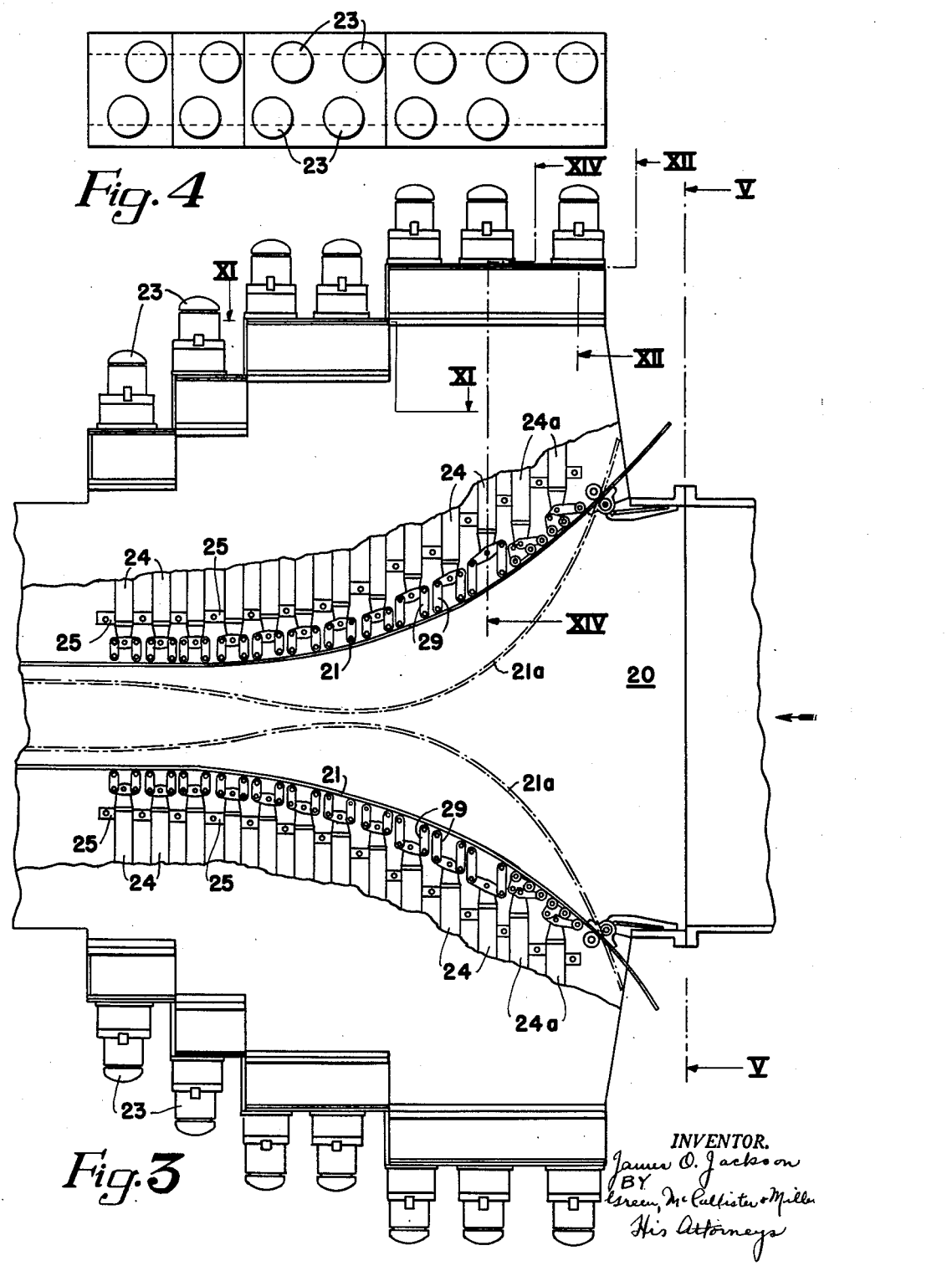

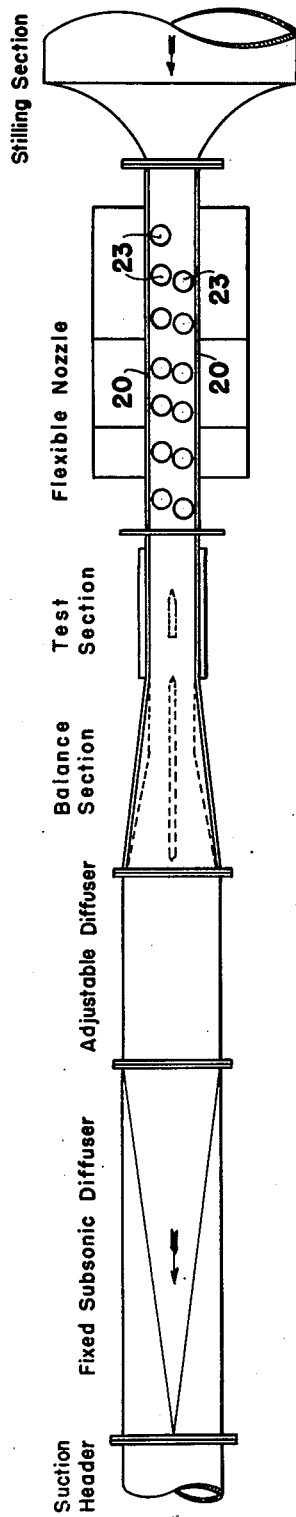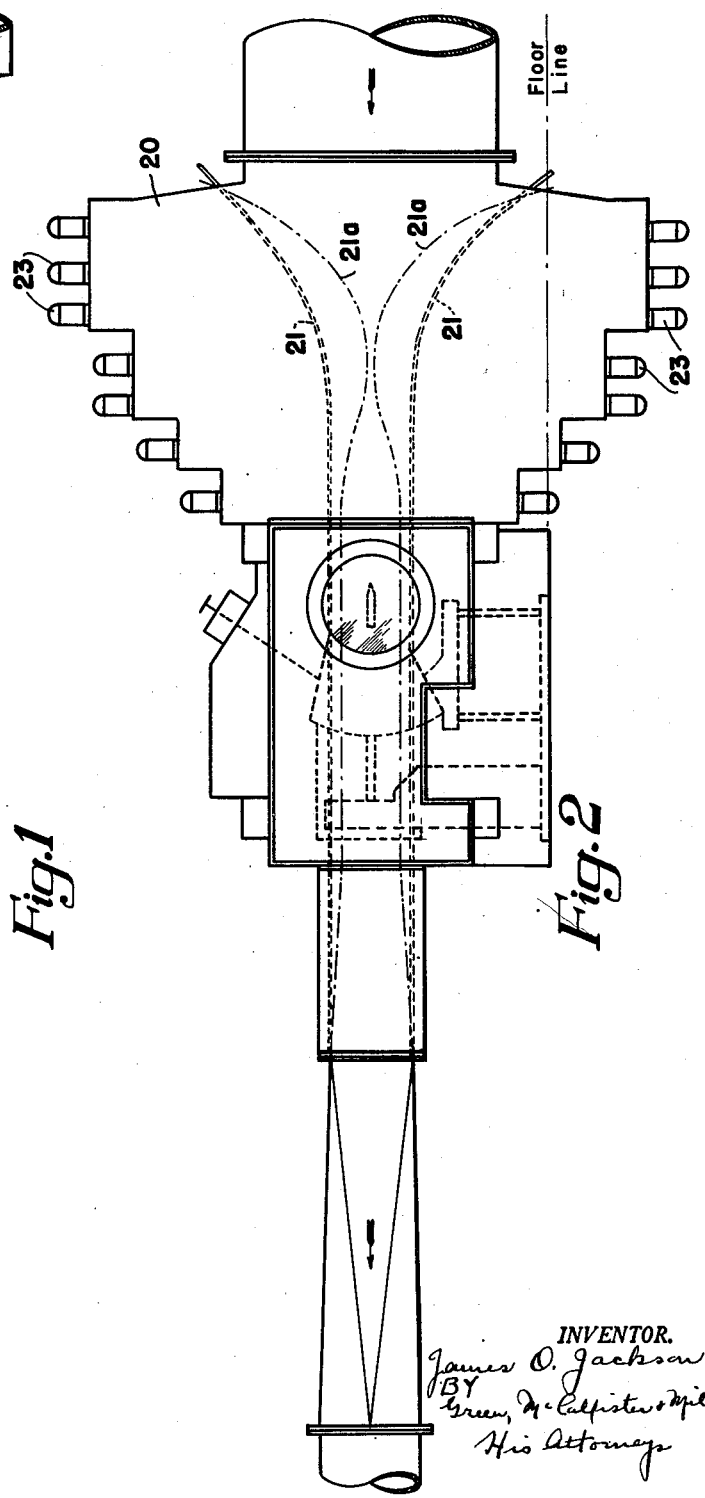

June 14, 1949.  J. O. JACKSON  2,472,949
FLEXIBLE NOZZLE FOR SUPERSONIC WIND TUNNELS
Filed Oct. 31, 1947  7 Sheets-Sheet 5

INVENTOR.
James O. Jackson
BY
Green, McCalister & Miller
His Attorneys

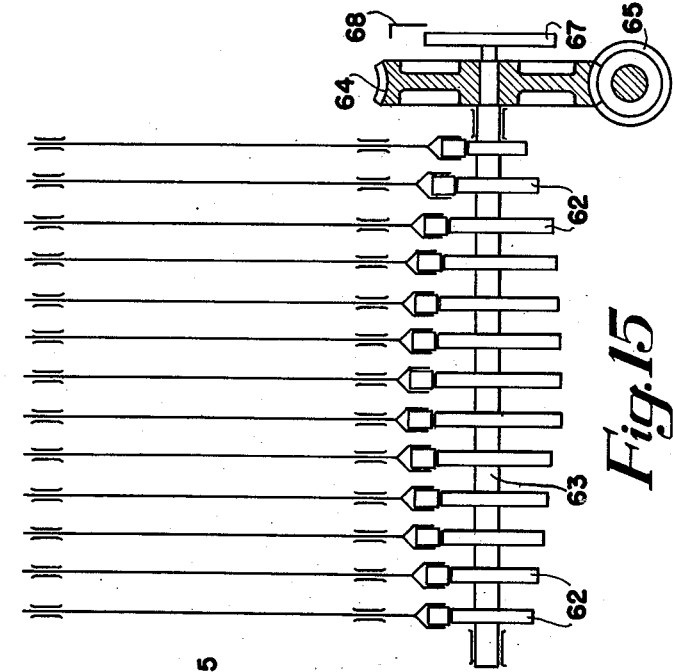
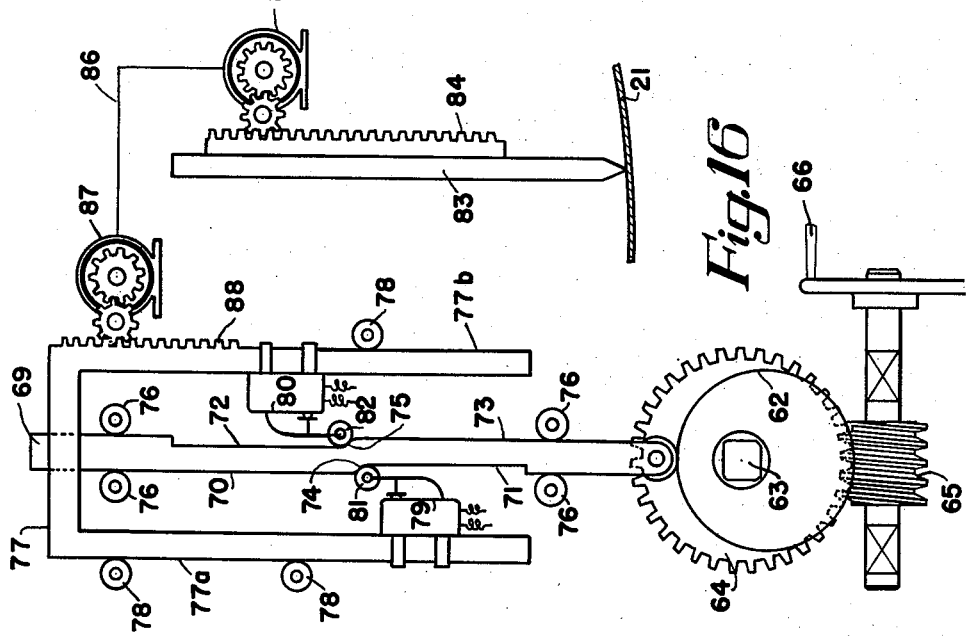

Patented June 14, 1949

2,472,949

UNITED STATES PATENT OFFICE 2,472,949

FLEXIBLE NOZZLE FOR SUPERSONIC WIND TUNNELS

James O. Jackson, Crafton, Pa., assignor to Pittsburgh-Des Moines Company, a corporation of Pennsylvania Application October 31, 1947, Serial No. 783,405

11 Claims. (Cl. 138—45)

1

This invention relates to supersonic wind tunnels and more particularly to nozzles for such tunnels.

One object of this invention is to produce a flexible nozzle for a supersonic wind tunnel and means for so adjusting such nozzle that the desired air speeds may be obtained in the test section of such wind tunnel.

Another object is to produce a flexible nozzle and means by which such nozzle may be quickly varied to produce air velocities in the tunnel test section ranging from subsonic to supersonic velocities.

A further object is to produce mechanism for so adjusting the contour of the flexible walls of a wind tunnel nozzle having two fixed and two flexible walls that the desired air speeds or velocities can be obtained in the tunnel test section which connects with the outlet of such nozzle.

A still further object is to produce mechanism for adjusting the flexible walls of a wind tunnel nozzle to vary the shape of a nozzle having a pair of such walls in order to change the air speeds in the tunnel test section from subsonic to supersonic velocities.

These and other objects will be apparent to those skilled in the art from the structure described in the specification and illustrated in the drawings accompanying and forming part of this application.

In the drawings:

Figures 1 and 2 are respectively schematic top plan and side elevational views of a number of contiguous sections of a supersonic wind tunnel, including a flexible nozzle and its actuating means embodying this invention;

Fig. 3 is an enlarged view partly in side elevation and partly in longitudinal section of such flexible nozzle and its actuating mechanism;

Fig. 4 is a top plan view of the nozzle of Fig. 3;

2

Figure 11:
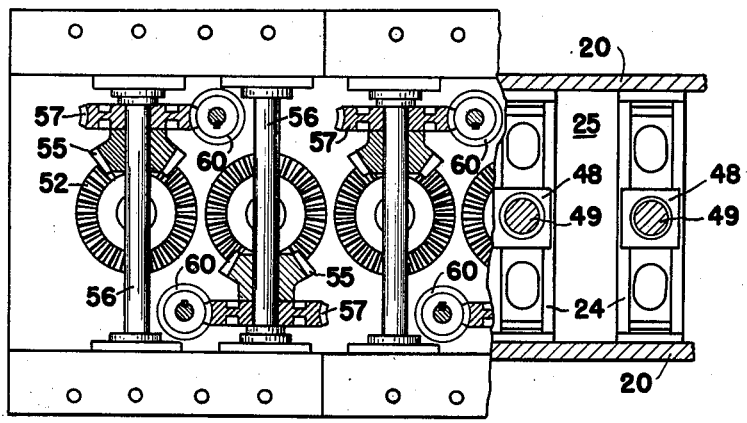
Figures 10, 12:
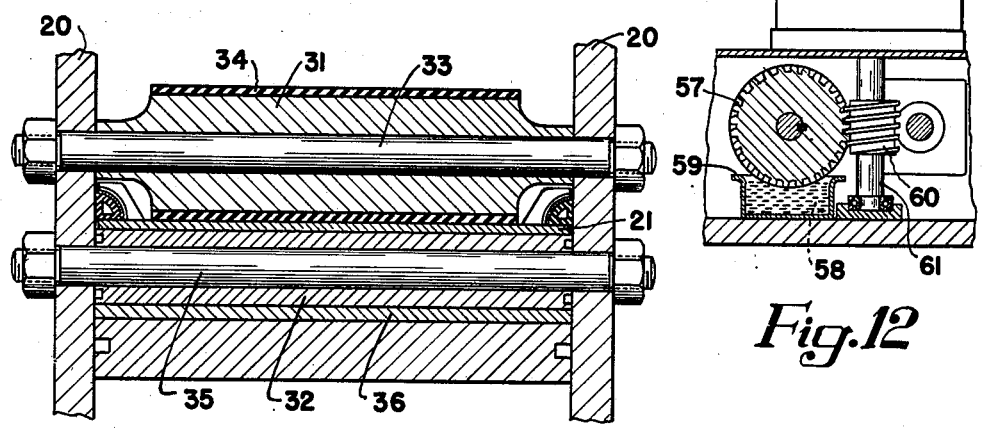
Fig. 10 is a sectional view taken on line X—X of Fig. 6.
Figures 13, 14:
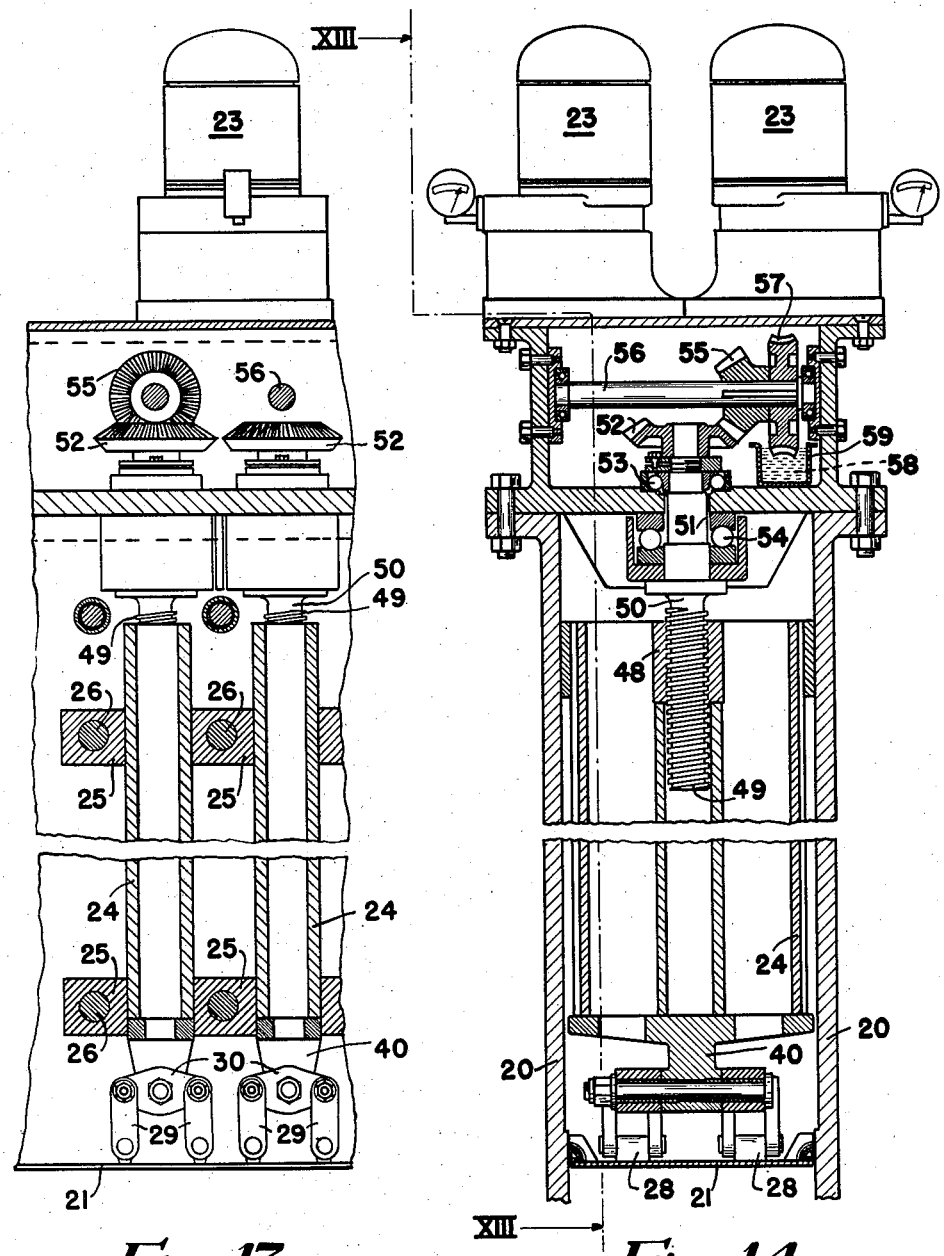

Fig. 11 is a view taken on the offset section line XI—XI of Fig. 3;

Fig. 12 is a sectional view taken on line XII—XII of Fig. 3;

Fig. 13 is a view taken on line XIII—XIII of Fig. 14;

Fig. 14 is a sectional view taken on line XIV—XIV of Fig. 3;

Fig. 15 is a diagrammatic illustration of the mechanism for controlling the operation of the devices by means of which the flexible walls are adjusted to the desired contours; and Fig. 16 is a diagrammatic view of one of the instrumentalities associated with each of the cams of Fig. 15 for controlling the operation of one pair of opposed jacks having operative connection with similar opposed outer side portions of the flexible walls of the nozzle.

A wind tunnel such as here contemplated is capable of continuous operation and therefore embodies a closed circuit within which contiguous sections of the tunnel are arranged in end to end relation as shown in Figures 1 and 2. In these views, the return portion of the tunnel leading from the fixed subsonic diffuser back to the stilling section, as well as other necessary parts such as compressors, driers, intercoolers and means for storing air, are omitted.

The flexible nozzle of this invention is designed to produce any air speed from subsonic velocities up to velocities of more than four times the speed of sound. The velocities, however, from 0.9 to 1.1 of the speed of sound are not usable by present wind tunnel technique, being within the transsonic or "blind spot" region.

The nozzle is rectangular in cross section and comprises two fixed side walls having their adjacent faces in parallel planes, and flexible top and bottom walls.

In one example of a nozzle embodying this invention, the side walls are spaced apart 15 inches. The height of the upstream end of the nozzle is 96 inches, while that of the downstream end may be varied from 14 to 22 inches. The fixed side walls comprise two flat steel plates, while each of the top and bottom walls, which are longitudinally flexible, comprises a steel plate having a thickness of ¼ inch, a width of 15 inches and a length sufficient to produce any of the desired nozzle curves. The lower plate extends beyond the outlet end of the nozzle section and forms the test section floor. The additional length of each plate due to the difference in arc length of the extreme nozzle curves is substantially 13 inches.

The flexible top and bottom wall plates are bent to the desired set of shapes by a series of screw jacks operatively connected to the outer sides of such plates and operated by electric motors. The operation of the screw jack motors in bending the plates to the desired shapes is such that the position of such plates varies continually from one shape to the next. This is accomplished by controlling the motors of each opposed pair of jacks by a cam, the ordinates of which are derived from the desired nozzle shapes. These cams are secured to a common shaft and, therefore, rotate simultaneously.

The flexible nozzle as shown in Figures 1 and 2, is located between the stilling section and the test section of the tunnel. Air at high pressure enters the nozzle from the stilling section through which the air is caused to travel at a low velocity for the purpose of reducing turbulence and eddies before the air enters the nozzle section.

The test section is that section of the wind tunnel in which the model to be tested is mounted. Each of the side walls of this section is provided with a removable window in line with the position at which the test model is to be located. These windows are used for observing and photographing flow phenomena in the air stream around the test model. The test models are placed in position and removed through the window openings.

The flexible nozzle

The vertically extending side walls 20—20 of the nozzle have their inner or adjacent faces located in spaced parallel planes as above mentioned and the top and bottom walls 21—21 fit snugly between the vertical side walls. The joints between the side walls and the flexible walls are hermetically sealed by pressurized devices 22 which are secured to the outer side of each flexible wall adjacent its opposite longitudinal edges and make sealing contact with both the outer faces of the flexible walls and the inner faces of the side walls.

Figure 5:
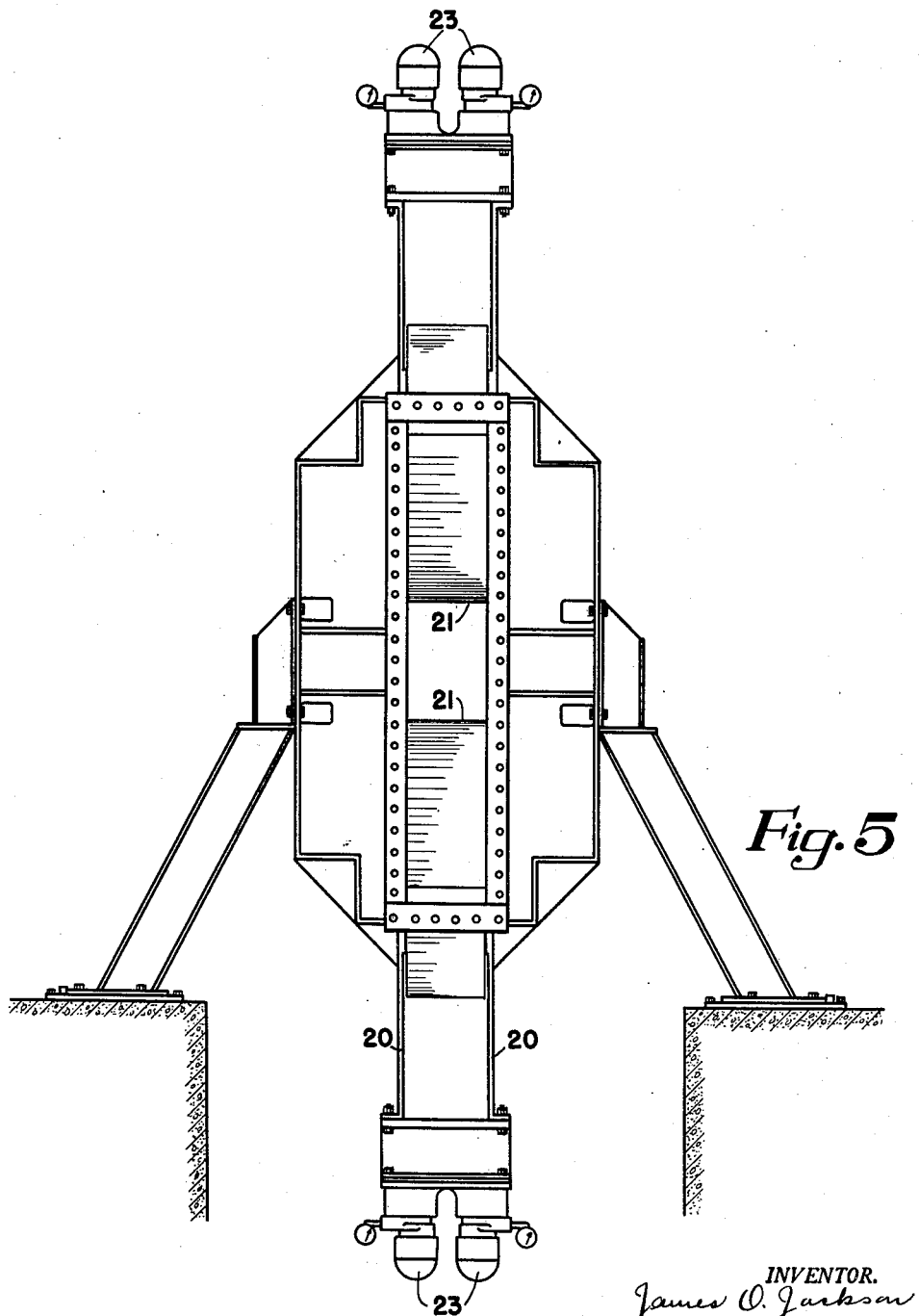
Fig. 5 is an end elevation of the nozzle section taken from line V—V of Fig. 3.

The jacks for adjusting the flexible plates 21—21 to the desired contours are operated by a series of electric motors 23 mounted on the top and bottom of the nozzle housing (Figs. 2, 3 and 5). The jack bodies 24 are mounted for reciprocation within the upper and lower portions of the nozzle housing and have their reciprocations confined to vertical paths by elements 25 which serve as spacers and guides. These are secured in place within the housing by tie rods 26 which are secured to the nozzle section side walls. Members 25 not only space and guide the jack bodies, but prevent the same from rotating.

Figure 8:
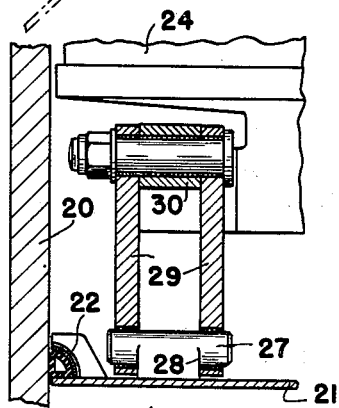
Fig. 8 is a sectional view taken on line VIII—VIII of Fig. 6.

Jack bodies 24, except the two opposed pairs adjacent the inlet end of the nozzle, which are numbered 24a, are attached to flexible top and bottom walls 21—21 by being connected to cylindrical ends 27 of lugs 28, by means of a pair of links 29 (Fig. 8) and an equalizer bar member 30 (Fig. 6) which has its ends connected to such links and at its longitudinal center is pivotally connected to the adjacent end of the jack body 24. Lugs 28 may be formed as unitary parts of flexible plate 21 or they may be welded to such plate at spaced positions therealong.

The test section end of each flexible plate 21 is fixed, while the opposite or stilling section end is free to move longitudinally of itself between two rollers 31 and 32 which bear against its opposite faces and thus support it.

Roller 31 is mounted for rotation about a shaft 33, has a rubber covering 34 and bears against the outer face of one such flexible plate 21. A bronze roller 32 which bears against the inner face of one such flexible plate is mounted for rotation about a pin 35 and is located within a slotted cylindrical pocket formed in a shoe-like member 36.

Member 36 pivots about bronze roller 32 which in turn rotates about pin 35. The wall of member 36 having the slot which permits roller 32 to contact with the inner face of plate 21 is provided, adjacent its opposite ends, with strip-like bearing elements 37 preferably formed of graphite impregnated bronze. Elements 37 form spaced seals which contact the flexible plate from one longitudinal edge thereof to the other.

The jacks having bodies 24a—those comprising the two opposed pairs nearest the stilling section end of the nozzle—are not attached to plates 21 as are the other jacks.

Each jack body 24a carries a device which merely contacts the outer face of a flexible plate. These jacks, however, do cause inward movement and limit outward movement of those portions of the flexible plates lying between the bite of support rollers 31—32 and the adjacent pair of jacks having bodies 24.

Figure 9:
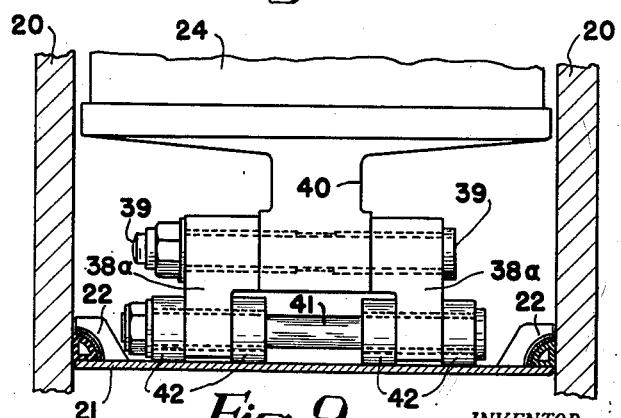
Fig. 9 is a sectional view taken on line IX—IX of Fig. 6.

Each of these devices comprises two levers, each having a short arm 38 and a long arm 38a. These levers are mounted on opposite ends of a shaft 39 which passes through the outer end member 40 of one of the jack bodies 24a (Fig. 9).

A shaft 41 which passes through openings in the outer ends of long arms 38a of such levers, and parallels shaft 39 carries four spaced rollers 42 (Fig. 9) which are adapted to contact the outer face of flexible plate 21.

Figure 6:
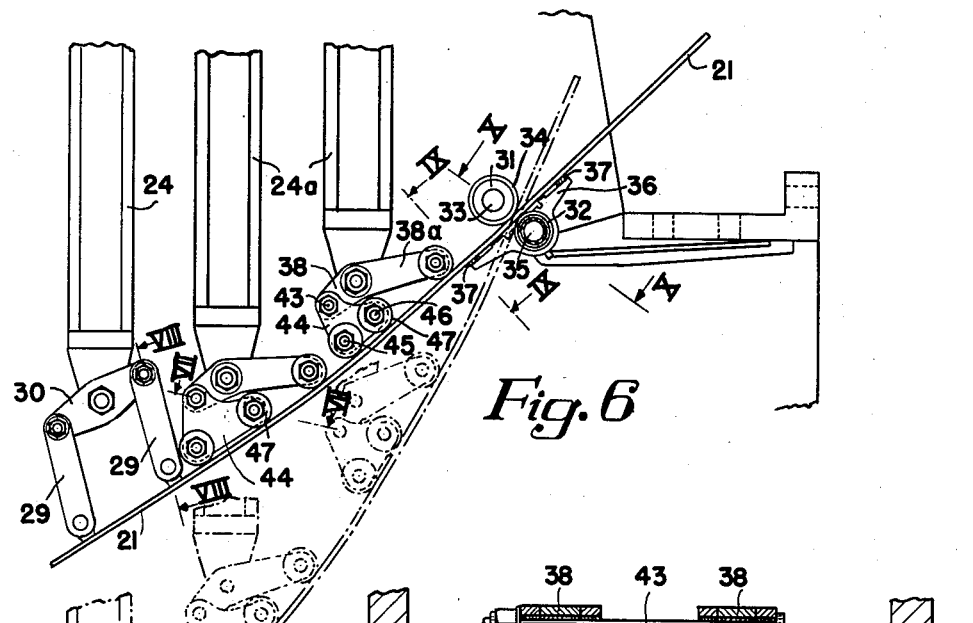
Fig. 6 is a fragmentary enlarged view of the upper flexible wall at the inlet end of the nozzle and shows means for supporting the inlet end portion of the upper flexible nozzle wall.
Figure 7:
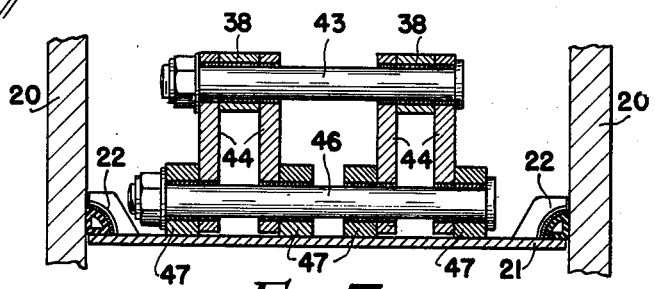
Fig. 7 is a sectional view taken on line VII—VII of Fig. 6.

The outer end of each short arm 38 is pivotally connected by means of a pivot shaft 43, to the top of a frame comprising four parallel plate members 44 (Figs. 6 and 7). The end of such frame remote from pivot shaft 43 carries two parallel shafts 45 and 46 (Figs. 6 and 7). Four rollers 47 mounted for rotation on each such shaft are arranged to contact with the outer face of flexible plate 21.

The jack bodies 24 are preferably rectangular in cross section as shown in Fig. 11 and each is provided at its inner end with a member 48 which has a vertically extending threaded bore as shown in Figures 11 and 14, for receiving a jack body operating screw 49. Screw 49 is formed on an extension 50 of a shaft 51 which is supported for rotation by an anti-friction bearing 53 and is provided with a thrust bearing 54. At its end opposite screw 49, shaft 51 has a gear 52 secured thereto.

Gear 52 meshes with a gear 55 which is keyed to a horizontal shaft 56 mounted in anti-friction bearings as disclosed in Fig. 14, and carries a worm wheel 57 which is also keyed thereto immediately adjacent gear 55.

Worm wheel 57 which is arranged to pick up oil 58 contained within an open top pan-like container 59, meshes with a worm 60 keyed to a vertical shaft 61 (Figs. 11, 12 and 14) which is connected to the shaft of one of the motors 23 by a coupling (not shown).

The shape or contour to be given the flexible walls 21 by the jacks depends upon the air speed desired in the test section of the tunnel.

Nozzle control

The mechanism I employ for controlling the operation of the jack motors in bending the flexible walls 21 to form the different nozzle shapes, includes a series of cams equal in number to the number of opposed pairs of jacks. Each cam of such series controls the operation of one opposed pair of jack motors and the ordinates of each such cam depend upon the curves to which those portions of flexible walls 21 under its control are to be bent.

In the nozzle structure of this application, there are 13 cams 62 (Fig. 15) mounted on and secured to a common shaft 63. Such shaft is adapted to be rotated to the desired positions by means of a vernier device comprising a worm wheel 64 secured to such shaft and a worm 65 which meshes with such worm wheel and is adapted to be manually operated by a crank 66.

In order that the cams may be rotated the proper distance for obtaining a certain air speed, a dial 67 mounted on shaft 63 has graduations thereon indicating different air speeds. A pointer 68 secured to some stationary part is arranged to cooperate with such dial in determining the different distances of cam rotation necessary to obtain the desired air speeds.

Each cam 62 has a follower bar 69 associated therewith. Such follower bar carries a cam contact roller at its lower end and two of its opposite sides are each provided with two straight parallel offset surfaces; those on one side being numbered 70 and 71 and those on the other side being numbered 72 and 73. Surfaces 70 and 71 are joined by an inclined surface forming a shoulder 74 while surfaces 72 and 73 are joined by an inclined surface forming a shoulder 75. Reciprocation of follower bar 69 by its cam 62 is confined to a single straight path by rollers 76. The construction and arrangement is such that follower bar 69 moves toward or from cam shaft 63 as its cam is rotated; the direction of movement depending upon the contour and direction of rotation of such cam.

An inverted generally U or yoke-shaped frame member 77 is so arranged that its legs 77a and 77b parallel the longitudinal axis of follower bar 69. Rollers 78—78 permit reciprocation of frame member 77 and limit the same to a path that parallels such longitudinal axis.

Each leg 77a and 77b of frame 77 has a micro-switch adjustably secured thereto. That carried by leg 77a is numbered 79 while that carried by 77b is numbered 80. The movable part 81 of switch 79 is adapted to bear on surfaces 70 and 71 of the follower bar while the movable part 82 of switch 80 is adapted to bear on surfaces 72 and 73 of such bar.

Micro-switches 79 and 80 are arranged to start the motors of an opposed pair of jacks in one or the other direction. That is, one of the switches when it is closed by follower bar 69 starts an opposed pair of jack motors to move the opposed portions of flexible walls 21 controlled thereby toward the axis of the nozzle while the other switch when it is closed by follower bar 69 starts such jack motors in the opposite direction so as to move such opposed portion of flexible walls 21 away from the axis of the nozzle.

In order to stop rotation of the jack motors when the flexible walls reach the positions corresponding to the setting of the dial 67 I provide means responsive to movement of the flexible walls for opening the circuits controlled by switches 79 and 80. This means comprises mechanism responsive to movements of at least one of the flexible walls 21 for moving yoke member 77 to cause the movable part of one or the other switch 79 or 80 to open the electrical circuit controlled thereby and stop the operation of the motors of the opposed pair of jacks when the position corresponding to the dial setting is reached. The movement of one of the flexible walls is sufficient since both move simultaneously the same distance but in opposite directions.

A sounding rod 83 associated with each cam 62 may be connected to the body of one of an opposed pair of jacks or may be independent of such body. The sounding rod is yieldingly urged into contact with the outer face of one of the flexible walls 21 adjacent the point at which the longitudinal axis of such jack body intersects such wall. The sounding rod carries a gear rack 84 and as the sounding rod moves, the gear rack is arranged to operate a self-synchronous transmitter 85 to which it is geared as shown in Figure 16. This transmitter 85 is connected by suitable wires 86 to a self-synchronous receiver 87. This receiver is geared to a rack 88 carried by one leg, in this case leg 77b, of frame 77. The construction and arrangement is such that as the sounding rod moves, frame 77 is caused to move the same distance and in the same direction as the sounding rod.

Self-synchronous devices found to be satisfactory for this purpose are those made and marketed by General Electric Company under the name "Selsyn."

It will be understood that each cam 62 has associated therewith a follower bar, a frame 77 carrying the micro-switches and that each sounding rod through its self-synchronous transmitter and receiver moves its associated frame 77 to cause the micro-switches to cut off current to the jack motors when flexible walls 21 reach the position corresponding to the setting of dial 67.

The location of the micro-switches on the legs of frame 77 can be adjusted (by means not shown) so as to regulate the amount of over-travel of the jack motors.

Because of the above construction and arrangement, when the cam shaft is adjusted so as to increase the air speed, the follower bars, by means of the cams, are moved away from the axis of the cam shaft; the distance in each case depending upon the air speed desired. Movement of the follower bars closes the micro-switch which starts the jack motors in the direction to bring the flexible walls closer to the longitudinal axis of the nozzle. As soon as the jacks start to operate and the flexible walls start to move, each frame 77 is moved until it reaches the position corresponding to the dial setting. When such position is reached the proper micro-switches open and the jack motors are stopped. The flexible walls are held in position until the cams are adjusted to a new dial setting.

During movement of the flexible walls from one setting of the control cams to another, it is not always possible to stop each of the electric motors at the exact instant it should stop according to the setting of such cams. I overcome this difficulty by allowing the individual motors and the jacks driven thereby to continue to operate in alternate directions until all parts of the flexible walls are in their proper final positions as determined by the setting of such cams.

In case of an over-run of any one of the motors and its jack, follower bar 69 associated with its control cam causes the opposed microswitch—79 or 80 as the case may be—to make contact and operate its controlled motor and jack in the reverse direction. This reversing of the motor and jack continues until the position of frame member 77, the movement of which is controlled by the position of the flexible walls 21, has so positioned micro-switches 79 and 80 that both are open or out of contact.

This final position may be controlled to within as close limits as desired, and may be accomplished by adjusting the position of microswitches 79 and 80 on legs 77a and 77b of frame member 77.

In order to prevent damage to the flexible walls by excessive longitudinal bending, I make the gear ratios between gears 52 and 55 and between motor worm 60 and worm gear 57 different for the different motor-jack combinations; selecting such ratios that the total time intervals, for all portions of the flexible walls for moving from their extreme inward positions to their extreme outward positions are the same.

In order to take care of a situation in which any of the jacks or their motors fail and also to prevent excessive bending of the flexible walls from any cause, I attach micro-switches to each flexible wall at spaced intervals therealong. These are arranged to break the circuit of the nearest jack motor when flexing of the wall in either direction has reached a danger point.

These micro-switches are not shown on the drawings since they are commercial devices and are merely attached to the outer side of each flexible wall preferably adjacent the connections for the jacks.

It may be desirable at times to increase the height of the test section in order to accommodate larger models or to secure more economical use of the air supply. In such cases, the flexible walls of the test section and, if desired, those of the balance section as well, can be positioned by motor driven jacks, and the control cam system here disclosed can be extended to include the motors for such jacks.

What I claim is:

1. In an adjustable nozzle or duct structure, a pair of spaced fixed walls, a pair of longitudinally flexible walls arranged between such fixed walls and with the same defining a rectangular duct or nozzle of varying cross section, multiple power operated means for moving such flexible walls toward and from the longitudinal axis of such duct or nozzle, a series of flexible wall contour determining cams, means responsive to movement of such cams for controlling the direction and amplitude of movement of such flexible walls occasioned by such means and means for simultaneously moving such cams.

2. In an adjustable nozzle or duct structure, a pair of spaced fixed walls, a pair of longitudinally flexible walls arranged between such fixed walls and with the same defining a rectangular duct or nozzle of varying cross section, multiple power operated jacks for moving such flexible walls toward and from the longitudinal axis of such duct or nozzle, a series of flexible wall contour determining cams, means responsive to movement of such cams for controlling the direction and amplitude of movement of such flexible walls occasioned by such jacks and means for simultaneously moving such cams.

3. In an adjustable nozzle or duct structure, a pair of fixed walls having their adjacent faces in spaced parallel planes, a pair of longitudinally flexible walls arranged between such fixed walls and with the same defining a rectangular duct or nozzle of varying cross section, multiple motor operated jacks having operative connection with the outer side portions of such flexible walls at spaced positions lengthwise thereof for flexing such walls toward and from the longitudinal axis of such duct or nozzle, a series of flexible wall contour-determining cams, mechanism including jack motor starting means responsive to movement of such cams for determining the direction and amplitude of movement of such flexible walls occasioned by such jacks and means for simultaneously moving such cams.

4. In an adjustable duct or nozzle structure, a pair of fixed walls having their adjacent faces located in spaced parallel planes, a pair of flexible walls arranged between such fixed walls and with the same defining a nozzle or passage of varying cross section throughout its length, electric motor operated screw jacks having operative connection with outer side portions of such flexible walls at spaced positions therealong for simultaneously flexing such walls toward and from the longitudinal axis of such passage, a series of rotatable flexible wall contour-determining cams, means responsive to movement of such cams for controlling the direction and extent of flexure of such flexible walls occasioned by such jacks and means for simultaneously rotating such cams.

5. In an adjustable duct or nozzle structure, a pair of stationary walls having their adjacent faces located in spaced parallel planes, a pair of flexible walls arranged between such stationary walls and with the same being adapted to define a nozzle or passage of varying cross section, means carried by such flexible walls for preventing leakage between such flexible and stationary walls, electric motor operated screw jacks having operative connection with outer side portions of such flexible walls at spaced positions therealong for simultaneously flexing such walls toward and from the longitudinal axis of such passage, a series of rotatable flexible wall contour-determining cams, means responsive to the movement of such cams for controlling the direction and extent of flexure of such flexible walls occasioned by such jacks and means for simultaneously rotating such cams.

6. In an adjustable nozzle structure, a pair of spaced stationary walls, a pair of longitudinally flexible walls arranged in spaced relation between such stationary walls and with the same being adapted to define a rectangular nozzle of varying cross section, two opposed series of electric motor driven screw jacks having operative connection with outer side portions of such flexible walls at spaced positions therealong for flexing such walls toward and from the longitudinal axis of such nozzle, a series of rotatable cams for determining the lengthwise contour of such flexible walls, a movably mounted frame for each such cam, two switch devices carried by each such frame for starting the operation of an opposed pair of jack motors in one or the other direction, a follower associated with each such cam for operating one or the other of such switch devices depending upon the direction of movement of such cam, means responsive to movement of at least one of such flexible walls for moving such frames and such switch devices to positions to stop the operation of such jack motors when such walls reach the contour corresponding to the setting of such cams, and means for simultaneously rotating such cams.

7. In an adjustable nozzle structure for a supersonic wind tunnel, a pair of spaced fixed walls having their adjacent faces located in parallel planes, spaced longitudinally flexible walls arranged between such fixed walls and with the same defining a nozzle of rectangular cross section, multiple jacks having operative connection with outer side portions of such flexible walls at spaced positions therealong for bending such walls longitudinally to different contours to change the characteristics of such nozzle, a series of movable cams for determining the longitudinal contour of such flexible walls, means for simultaneously moving such cams, means responsive to movement of such cams for starting the operation of such jacks in one or the other direction, depending upon the movement of such cams, and mechanism responsive to the movement of at least one of such flexible walls for stopping the operation of such jacks when the contour of such flexible walls corresponds to the setting of such cams.

8. In an adjustable nozzle or duct structure, a pair of spaced fixed walls, a pair of spaced longitudinally flexible walls arranged for movement between such fixed walls and with such fixed walls being adapted to define a rectangular duct or nozzle of varying cross section, a number of opposed pairs of jacks having operative connection with opposed outer side portions of such flexible walls at spaced positions therealong, motors for operating such jacks to move such flexible walls toward or from the longitudinal axis of such duct or nozzle, a series of movable cams for determining the longitudinal contour of such flexible walls, separate agents for initiating the operation of both motors for all opposed pairs of jacks in one or the other direction, depending upon the movement of such cams, means responsive to the movement of at least one such flexible wall for stopping the operation of the jack motors when the longitudinal contour of such flexible walls corresponds to the setting of such cams, and means for simultaneously moving such cams.

9. In an adjustable nozzle or duct structure, a pair of spaced fixed walls having their adjacent faces defining parallel planes, a pair of spaced longitudinally flexible walls arranged for movement between such fixed walls and with the same being adapted to define a rectangular duct or nozzle of varying cross section, a number of opposed pairs of screw jacks having operative connection with opposed outer side portions of such flexible walls at spaced positions therealong, electric motors for operating such jacks to move such flexible walls toward or from the longitudinal axis of such duct or nozzle, a series of rotatable cams for determining the longitudinal contour of such flexible walls, separate switch devices for initiating the operation of both motors for all opposed pairs of jacks in one or the other direction, depending upon the movement of such cams, means responsive to the movement of at least one such flexible wall for stopping the operation of the jack motors when the longitudinal contour of such flexible walls corresponds to the setting of such cams, and means for simultaneously rotating such cams.

10. In an adjustable nozzle or duct structure, a pair of opposed longitudinally flexible walls, multiple power operated devices for simultaneously moving such flexible walls toward and from one another, a series of flexible wall contour-determining cams, means responsive to the movement of such cams for starting the operation of such devices, means responsive to the movement of at least one such flexible wall for stopping the operation of such devices and means for simultaneously moving such cams.

11. In an adjustable nozzle or duct structure, a pair of spaced fixed walls, a pair of longitudinally flexible walls arranged between such fixed walls and with the same defining a rectangular duct or nozzle of varying cross section, multiple power operated devices for moving such flexible walls toward and from the longitudinal axis of such duct or nozzle, a series of flexible wall contour-determining cams, means responsive to the movement of such cams for starting the operation of such devices, means responsive to the movement of at least one of the flexible walls for stopping the operation of such devices, and means for simultaneously moving such cams.

JAMES O. JACKSON.

REFERENCES CITED

The following references are of record in the file of this patent:

UNITED STATES PATENTS

| Number | Name | Date |
|---|---|---|
| 2,424,654 | Gamble | July 29, 1947 |